(12) United States Patent
Quincieu (10) Patent No.: US 7,644,890 B2
(45) Date of Patent: Jan. 12, 2010

(54) LOW-ENERGY LOCKING HINGE MECHANISM FOR DEPLOYABLE DEVICES

(75) Inventor: Joël Quincieu, Hyde Park, UT (US)

(73) Assignee: Utah State University, Logan, UT (US)

( * ) Notice: Subject to any disclaimer, the term of this patent is extended or adjusted under 35 U.S.C. 154(b) by 691 days.

(21) Appl. No.: 11/446,443

(22) Filed: Jun. 1, 2006

(65) Prior Publication Data

US 2007/0278352 A1    Dec. 6, 2007

(51) Int. Cl.
*B64G 1/40* (2006.01)
(52) U.S. Cl. .................. 244/172.6; 244/172.7; 192/22; 192/27; 16/319; 16/312; 16/313; 16/325
(58) Field of Classification Search .............. 244/172.6, 244/172.7; 192/22, 27; 16/319, 312, 313, 16/325
See application file for complete search history.

(56) References Cited

U.S. PATENT DOCUMENTS

| 4,103,392 A | 8/1978 | MacDonald |
|---|---|---|
| 4,780,726 A | 10/1988 | Archer et al. |
| 4,880,188 A | 11/1989 | Roth et al. |
| 5,037,043 A | 8/1991 | Roth et al. |
| 5,328,446 A | 7/1994 | Bunnell et al. |
| 5,673,459 A | 10/1997 | Baghdasarian |
| 5,833,176 A | 11/1998 | Rubin et al. |
| 5,911,536 A | 6/1999 | Roth |
| 6,010,096 A | 1/2000 | Baghdasarian |
| 6,478,261 B2 | 11/2002 | Laraway et al. |
| 6,484,972 B1 * | 11/2002 | Viale ........................ 244/172.6 |
| 6,889,411 B2 | 5/2005 | Hinkley et al. |
| 2001/0010621 A1 | 8/2001 | O'Neal |

FOREIGN PATENT DOCUMENTS

| EP | 0103517 | 3/1984 |
|---|---|---|
| GB | 2 295 201 | 5/1996 |
| JP | 2004029953 | 1/2004 |
| WO | WO0138679 | 5/2001 |

* cited by examiner

*Primary Examiner*—J. Woodrow Eldred (57) ABSTRACT

A low-energy locking hinge mechanism operable with a spacecraft to support a deployable device, and to facilitate the deployment and locking of the deployable device, the hinge mechanism comprising: (a) a support base configured to couple to a structure of the spacecraft; (b) means for securing a deployable device to the support base, the deployable device being configured to rotate about a pivot axis; (c) a one-way clutch supported about the support base and operable with the means for securing, the one-way clutch being configured to facilitate one-way rotation of the deployable device from a stowed position to a deployed position, and to lock the deployable device in the deployed position, the one-way clutch having an inherent actuatable locking function configured to prevent backward motion; and (d) an actuation member operable with the one-way clutch to deploy the deployable device from the stowed position to the deployed position, the actuation member comprising an actuation energy sufficient to actuate the locking function of the one-way clutch within a zero-gravity environment.

20 Claims, 7 Drawing Sheets

LOW-ENERGY LOCKING HINGE MECHANISM FOR DEPLOYABLE DEVICES

GOVERNMENT SUPPORT CLAUSE

This invention was made with support from the United States Government, and the United States Government may have certain rights in this invention pursuant to Department of Defense, Air Force Office of Scientific Research, F49620-03-1-0198.

FIELD OF THE INVENTION

The present invention relates generally to deployment systems configured for use on a spacecraft to deploy a deployable device, such as an antenna. More particularly, the present invention relates to a hinge mechanism operable within a deployment system for deploying and locking or retaining a deployable device in a deployed position, wherein the hinge mechanism comprises a low-energy locking configuration designed to lock and maintain the deployable device in a deployed position without having to overcome a latching force.

BACKGROUND OF THE INVENTION AND RELATED ART

Spacecraft, such as satellites, shuttles, etc., typically employ one or more types of deployable devices or systems or structures, such as solar panels, antennas, etc. These deployable devices are secured to the spacecraft using some type of deployment system (e.g., a hinge or other mechanism) designed to maintain the deployable device in a stowed position during the launch of the spacecraft, and to facilitate the deployment of the device to a deployed or expanded position when needed once the mission of spacecraft is underway.

Prior art deployment systems used to secure the deployable device to the spacecraft differ somewhat in their features and configurations, but most comprise several common elements, such as an actuating device, a principal axis, a fixed support base, a deployable arm, a position sensor, a stop or stopper, and some type of latching or locking device.

In many prior art deployment systems that utilize a hinge mechanism, springs are the means most commonly used to generate the torque and energy needed to cause the deployable device to go from a stowed position from a deployed position, but motor-driven systems are also utilized. Within these spring loaded hinge mechanisms, stoppers and latches are typically used to halt and lock the deployable motion, respectively. In essence, the stopper functions as a barrier to halt the motion of the deployable mechanism, while the latch or lock functions to prevent maintain the deployable device in its deployed position, as well as to prevent back driving or counter rotation due to rebounding. An end-of-travel latch may be used to keep the deployable devices from oscillating during spacecraft maneuvers and interfering with the attitude control systems of the spacecraft. For instance, spacecraft maneuvers can cause the deployable device to swing which may induce periodic dynamic loads. Utilizing a latch will ensure that the spacecraft and the associated deployable devices maintain a cohesive overall structural stiffness and rigidity.

Latches and stoppers themselves may differ in their design and configuration, but most are intended to fulfill the same general function, namely to maintain the deployable device in its stowed position. Providing a positive latch at the end of travel, in addition to a stop, is the most common configuration. However, these types of latches require a sufficient amount of energy or force to actuate, which energy may be provided by the spring near or at the end-of-travel of the deployable device. In other words, the spring energy must be sufficient to overcome the resistance present within the latch. The problem is further compounded when one considers that spring energy typically decreases as the spring is allowed to approach a state of equilibrium, which in the case of a deployment system for a deployable device is as the deployable device nears the deployed position.

Other prior art deployment systems eliminate the use of a latch at the end of travel and rely solely on the force exerted by the spring to hold the deployable device against the stop. Although the elimination of a latch reduces overall system complexity, there is a significant drawback in that in order to provide a high strength restraint at the end of travel, the spring energy would need to be sufficiently high, which would undesirably cause excessive end-of-travel loads during the deployment phase. To absorb the additional loads, some type of dampener or other limiting element may be needed, which would ultimately increase the complexity of the system and create other problems.

The types of latches that are the most common in the industry include, magnetic latches, over-center latches, snap-action latches, motor driven latches, and sprocket mechanisms. Magnetic latches are most often associated with furniture cabinets as to provide a simple form of locking. The latch consists of a magnet located on the door of the cabinet and a mating magnet held on the frame of the door. Such latches are simple in design and easy to assemble. Magnetic latches may be used in space applications, but within such applications they present several significant drawbacks. First, the magnetic field generated by the magnets may interfere with on-board electronics. Second, this same magnetic field may also negatively affect the attitude control system of the spacecraft (e.g., it may add perturbation to the attitude control system) by creating magnetic torque between the magnet and the earth's natural magnetic field. Third, the magnets may lose some of their strength as a result of the conditions they are subjected to, such as temperature variations or high shocks.

Over-center latches utilize rigid bar linkage to provide a counter retaining force. This type of latch can be found on the retractable landing gear systems of common aircraft. Over-center latches utilize a complex configuration of moving parts, and require extensive manufacturing process control, assembly of the many component parts, and low tolerances.

Snap-action latches are designed to passively snap a moving body into a cavity, groove or hole or other form of mating receptacle. A good example of a snap-action latch can be found on any door that will automatically latch when pushed against the doorframe. Snap-action latches may passively be engaged due to their geometry but will need an external load, such as a door handle, to be disengaged. For a deployable device that uses a hinge mechanism actuated by a torsion spring, a significant amount of energy may be required to actuate the snap-action latch at end of travel. This requires that the spring must be configured to comprise enough energy to counteract the resistance from the latch. This added energy may be sufficient to induce a shock within the system if some type of shock absorbing element is not present.

Motor-driven latches require a motor to drive, in a linear or circular motion, a pin, finger or wedge that will close to retain or lock the deployable device. The main advantage of using a motor resides in the capability of the deployable device to be fully controlled by the operator to achieve any number of deployed positions. The same can be said for any form of active system that may be controlled to achieve multiple positions. An electrical motor, magnetic pin puller, a hydraulic actuator or any other form of active mechanism may drive the latch. The drawback for such a system is the need for an external controlling unit to drive the deployable device. In addition, motor-driven latches may require gear train or mechanical coupling configurations that significantly increase the complexity of the system and the potential for malfunction. Indeed, these types of latches require more parts, have high operational risks, are expensive, and utilize complex electromechanical interactions.

A sprocket mechanism is another alternative system capable of preventing back driving or counter rotation of the deployable device. This simple design may easily be implemented around a shaft and is widely found in many applications, such as tie-downs, blinds, tooling, bikes and other systems or structures. Sprocket mechanisms provide free pivoting or rotation in one direction, while preventing rotation in an opposing direction. While sprocket mechanisms are easy to implement, they have one major drawback, which is backlash or back drive produced before reaching the locked or latched position. Backlash can be detrimental to a deployable device in that its stiffness and pointing accuracy are adversely affected. This is particularly important in those circumstances in which the actuation spring is fractured and unable to maintain an actuation force on the deployable device, which force would otherwise reduce the degree of backlash.

Additional latching mechanisms, such as wedge latches, cam latches, and leaf latches are also provided for in some space applications. Each of these utilize mechanical resistance or friction to operate, which resistance can lead to undesirable results.

SUMMARY OF THE INVENTION

In light of the problems and deficiencies inherent in the prior art, the present invention seeks to overcome these by providing a low-energy locking hinge mechanism for deployable devices.

In accordance with the invention as embodied and broadly described herein, the present invention features a low-energy locking hinge mechanism operable with a spacecraft to support a deployable device, and to facilitate the deployment and locking of the deployable device, the hinge mechanism comprising: (a) a support base configured to couple to a structure of the spacecraft; (b) means for securing a deployable device to the support base, the deployable device being configured to rotate about a pivot axis; (c) a one-way clutch supported about the support base and operable with the means for securing, the one-way clutch being configured to facilitate one-way rotation of the deployable device from a stowed position to a deployed position, and to lock the deployable device in the deployed position, the one-way clutch having an inherent actuatable locking function configured to prevent backward motion; and (d) an actuation member operable with the one-way clutch to deploy the deployable device from the stowed position to the deployed position, the actuation member comprising an actuation energy sufficient to actuate the locking function of the one-way clutch within a zero-gravity environment.

The present invention also features a deployment system operable with a spacecraft and configured to deploy a deployable device, the deployment system comprising: (a) a deployable device operable with the spacecraft; (b) a hinge mechanism coupled to a structure of the spacecraft and configured to support the deployable device, as well as to facilitate deployment of the deployable device, the hinge mechanism comprising: (i) a support base configured to couple to a structure of the spacecraft; (ii) means for securing a deployable device to the support base, the deployable device being configured to rotate about a pivot axis; (iii) a one-way clutch supported about the support base and operable with the means for securing, the one-way clutch being configured to facilitate one-way rotation of the deployable device from a stowed position to a deployed position, and to lock the deployable device in the deployed position, the one-way clutch having an inherent actuatable locking function configured to prevent backward motion; and (iv) an actuation member operable with the one-way clutch to deploy the deployable device from the stowed position to the deployed position, the actuation member comprising an actuation energy sufficient to actuate the locking function of the one-way clutch within a zero-gravity environment.

The present invention further features a hinge mechanism operable with a spacecraft to support a deployable device, and to facilitate the deployment and locking of the deployable device, the hinge mechanism comprising: (a) a support base; (b) a one-way clutch supported about the support base and comprising a low-energy locking function; (c) an actuation member supported about the support base, the actuation member being configured to exert an actuation force comprising an actuation energy sufficient to cause the deployable device to transition from a stowed position to a deployed position, and thus actuate the one-way clutch, within a zero-gravity environment.

The present invention still further features a method for retaining and selectively deploying a deployable device as operable within a deployment system on a satellite, the method comprising: (a) obtaining a hinge mechanism configured to support and to facilitate the deployment and locking of a deployable device, the hinge mechanism comprising a one-way clutch and an actuation member supported about a support base; (b) relating a deployable device to the hinge mechanism; and (c) actuating an actuation member comprising an actuation energy sufficient to cause the deployable device to transition from a stowed position to a deployed position, and to thus actuate the one-way clutch, within a zero-gravity environment.

The present invention still further features a method for constructing a hinge mechanism for a deployable device, the method comprising: (a) supporting a one-way clutch about a support base, the one-way clutch comprising a low-energy locking function; (b) relating the one-way clutch to the deployable device; (c) supporting an actuation member about the support base, and configuring the actuation member to exert an actuation force comprising an actuation energy sufficient to cause the deployable device to transition from a stowed position to a deployed position, and to thus actuate the one-way clutch, within a zero-gravity environment; and (d) relating the actuation member to the one-way clutch to facilitate rotation of the deployable device with respect to the support base, and actuation of the one-way clutch.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 6-A illustrates a side view of a one-way clutch in accordance with one exemplary embodiment;

FIG. 6-B illustrates a cross-sectional front view of the one-way clutch of FIG. 6-A.

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for deploying a deployable device on a spacecraft, such as a satellite, shuttle, rover, etc. Generally, the present invention comprises a hinge mechanism, operable within a deployment system, described herein, which reduces the complexity of current designs by providing or utilizing a roller one-way clutch that functions as the latching device for a deployable, wherein the one-way clutch eliminates the need to overcome a latching force, and as a result permits low energy actuation of the deployable from a stowed position to a deployed position. In other words, the present invention hinge mechanism does not require latching energy (resistance) to lock the deployable in its deployed position, only a sufficient amount of actuation energy (e.g., an actuation force produced via a low-energy actuation member or means) to cause the deployable to travel or transition from a stowed position to a deployed position, which motion functions to actuate the clutch.

The present invention hinge mechanism further reduces the complexity of current designs by not requiring a device configured to absorb end-of-travel shock as the end-of-travel force exerted by the deployable and the hinge mechanism is reduced due to the low-energy actuation member that may be employed. Indeed, the actuation member (e.g., the loaded torsional spring discussed below), or rather the magnitude of exerted actuation force created by the actuation member, may be significantly reduced, particularly in the pre-load condition, to provide only the necessary energy needed to initiate rotation of the deployable device, which rotation is continued through to an end-of-travel stop. The present invention is intended to be adaptable and to accommodate any deployable device that may be supported on a satellite, and that utilizes rotational motion.

As used herein, the phrase "deployable" (when being used as a noun) and "deployable device" shall be understood to mean any type of object, device, system, component, etc. that is operable with a hinge mechanism, and that is configured and intended to travel or transition from a stowed or collapsed position to a deployed position. In addition, and although not to be construed as limiting, the term "deployable device" shall preferably refer to those types of deployable devices operable on a spacecraft, such as a satellite, wherein the deployable device is intended for deployment and operation within a zero-gravity or weightless environment. Examples of deployable devices include, but are not limited to, antennas, solar panels, reflectors, and others.

The term "latch," as used herein, shall be understood to mean an actuatable latch, as conventionally known, in which a latch resistance must be overcome to actuate.

The phrase "latch resistance," as used herein, shall be understood to mean the inherent resistive force within a latch that must be overcome in order for the latch to be actuated.

The phrases "latching force," "latch force," or "latching energy," as used herein, shall be understood to mean the energy required to load or to overcome the latch resistance within a latch, as conventionally understood.

The phrase "low-energy locking" as used herein, shall be understood to mean the securing of a deployable device in a secured position without the need for a latching force or latching energy to overcome a latch resistance. Although a certain amount of energy is needed to deploy the deployable device and to actuate the one-way clutch, the present invention hinge mechanism may be considered a latchless device, in terms of not requiring a conventional latch. Indeed, no latch resistance is present within the hinge mechanism, thus eliminating the need to generate or provide latching energy. As such, the energy, or actuation energy, needed to deploy the deployable device and actuate the one-way clutch may be minimized. In one aspect, this may comprise configuring the hinge mechanism such that the actuation energy is only sufficient within a zero-gravity environment.

Figure 1:
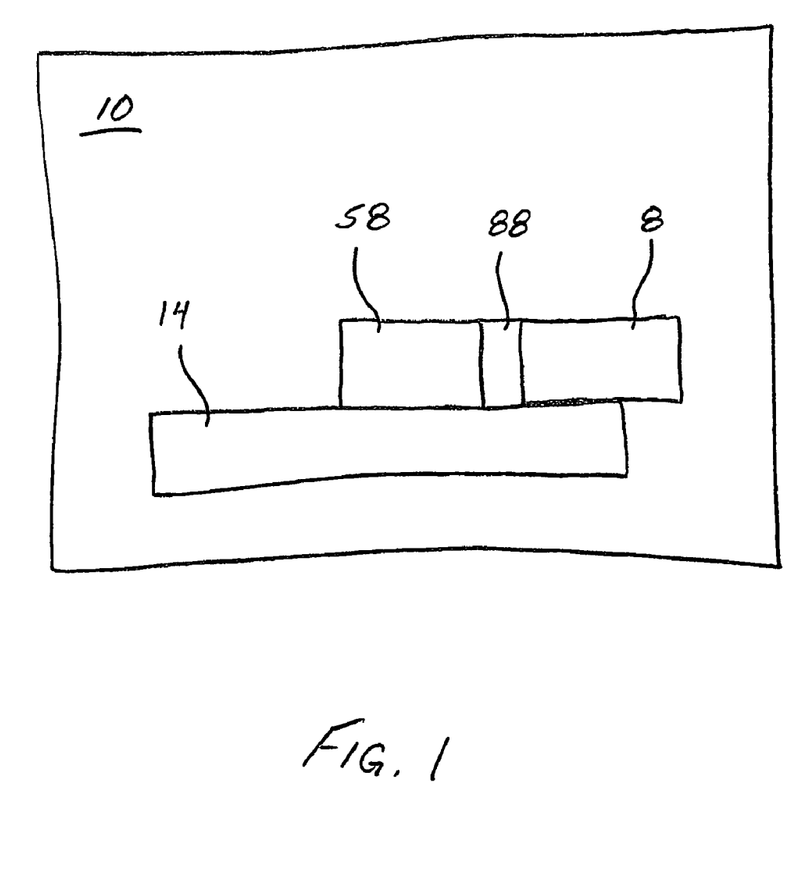
FIG. 1 illustrates a general block diagram of a low-energy locking hinge mechanism in accordance with the present invention.
Figure 2:
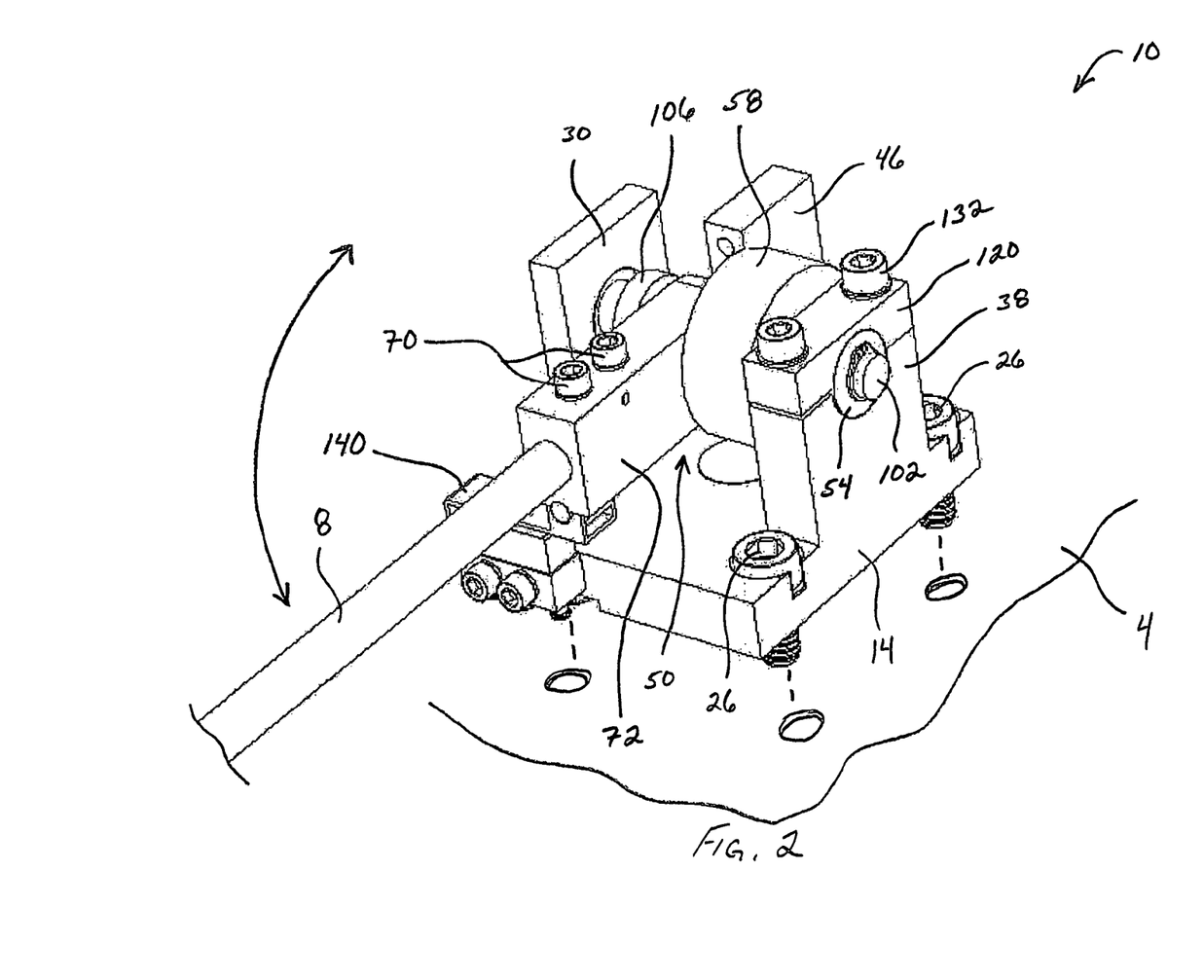
FIG. 2 illustrates a perspective view of a low-energy locking hinge mechanism as coupled to a satellite, in accordance with one exemplary embodiment of the present invention.

With reference to FIG. 1, illustrated is a general block diagram of the present invention low-energy locking hinge mechanism. As shown, the hinge mechanism 10 comprises a support base 14 configured to support thereon a one-way clutch 58, an actuation member 88, and a deployable device 8. The support base 14 may comprise any desired configuration. The one-way clutch 58 may comprise any type of one-way clutch, including a ratchet. The actuation member 88 is configured to provide the actuation energy needed to deploy the deployable device 8 from its stowed position to a deployed position. Each of these components and elements will be described in greater detail below.

With reference to FIGS. 2-5, illustrated is a low-energy locking hinge mechanism in accordance with one exemplary embodiment of the present invention, wherein the low-energy locking hinge mechanism is configured for use with a satellite to effectively support a deployable device operable with one or more systems of the satellite. As shown, the low-energy locking hinge mechanism 10 comprises a support base 14 configured to couple to a structural component or structural member of a satellite, such as to an exterior panel, or a frame. The primary function of the support base 14 is to operably support the deployable device about the satellite, and more particularly the deployment assembly used to retain and control the selective deployment of the deployable device. The support base 14 may be coupled to a satellite structure using any known attachment or mounting means. In one aspect, the support base 14 may be removably coupled to the satellite structure using one or more types of fasteners (e.g., bolts, screws, rivets, etc.). In the embodiment shown, the support base 14 is coupled to a satellite structure 4, such as exterior panel, using bolts 26 that are inserted through corresponding apertures formed in the satellite structure, shown as panel 4. In another aspect, the support base 14 may be more permanently mounted to the satellite structure using more permanent attachment or mounting means, such as welding. In any event, the support base 14 is configured to provide the necessary support for the remaining components of the low-energy locking hinge mechanism 10, particularly the deployment assembly, as well as the deployable device.

The support base 14 may comprise any size and shape, depending upon, among other things, the type of deployable device to be supported by the hinge mechanism and the support base 14, the location of the hinge mechanism on the satellite, and any other requirements. In addition the support base 14 may be configured to support any number of deployable devices, as will be explained in further detail below.

Extending from the outer surface 18 of the support base 14 is a first mount 30 having an aperture 34 formed therein. The first mount 30 may be configured to extend upward from an edge or other location of the support base 14 a sufficient distance so as to orient the aperture 34 at an offset or elevated position relative to the surface 18. Located a distance away from the first mount 30, such as at an opposing edge of the support base 14, is a second mount 38, also having an aperture 42 formed therein. The aperture 42 of the second mount 38 is also oriented in an offset or elevated position relative to the surface 18. The first and second apertures 34 and 42 are configured to be coaxial or concentric with one another for the purpose explained below.

The first and second mounts 30 and 38 may be integrally formed with the support base 14, or they may be independent structures that couple or join to the support base 14. In addition, the first and second mounts 30 and 38 may be further complemented by any additional number of mounts. In other words, it is contemplated that the hinge mechanism may contain any number of mounts as needed.

The support base 14 further comprises a stopper 46 configured to limit the rotation of the hinge mechanism, and particularly the deployment assembly, namely the one-way clutch and the deployable device. The stopper 46 is shown as being configured to come in contact with one or more components of the deployment assembly, in this case adapter 72, to limit further rotation of the one-way clutch, thus positioning the deployable device in a deployed position on a deployment angle that is about 90° as measured from the stowed position of the deployable device 8. Of course, one skilled in the art will recognize that the stopper 46 may be configured to limit the rotation of the one-way clutch and position the deployable device to any deployed position and at any deployment angle within a 360° rotation, but will preferably limit rotation of the clutch to position the deployable device in a deployed position to comprise a deployment angle between 0° and 180°, with the 0° position referencing the resting, stowed position of the deployable device 8.

In one exemplary embodiment, the stopper 46 may comprise an adjustment mechanism, wherein the deployment angle may be adjusted as needed. The adjustment mechanism may be any known in the art, such as a set screw operably supported within the stopper 46 that can be manipulated to alter the deployment angle.

The hinge mechanism may further comprise some type of impact absorption member, such as a shock absorber or dampening device, configured to reduce the impact force between the stopper and the one or more components of the deployment assembly. For example, the stopper, or the components of the deployment assembly, may comprise a flexible member, such as a member made of rubber or other suitable known material, positioned to receive the other to lessen the impact resulting from deployment of the deployable device as it reaches its deployed position defined by the stopper.

The first and second mounts 30 and 38, either independent of and coupled to or as integrally formed with the support base 14, function to support a deployment assembly 50 that functions to retain the deployable device in a stowed position, as well as to control deployment of the deployable device from its stowed position to a deployed, operating position upon actuation of the deployment assembly 50. As shown, the deployment assembly 50 comprises a plurality of interacting components, each of which facilitate the rotational support of the deployable device within the hinge mechanism 10, and each of which are described in the following paragraphs.

Figure 3:
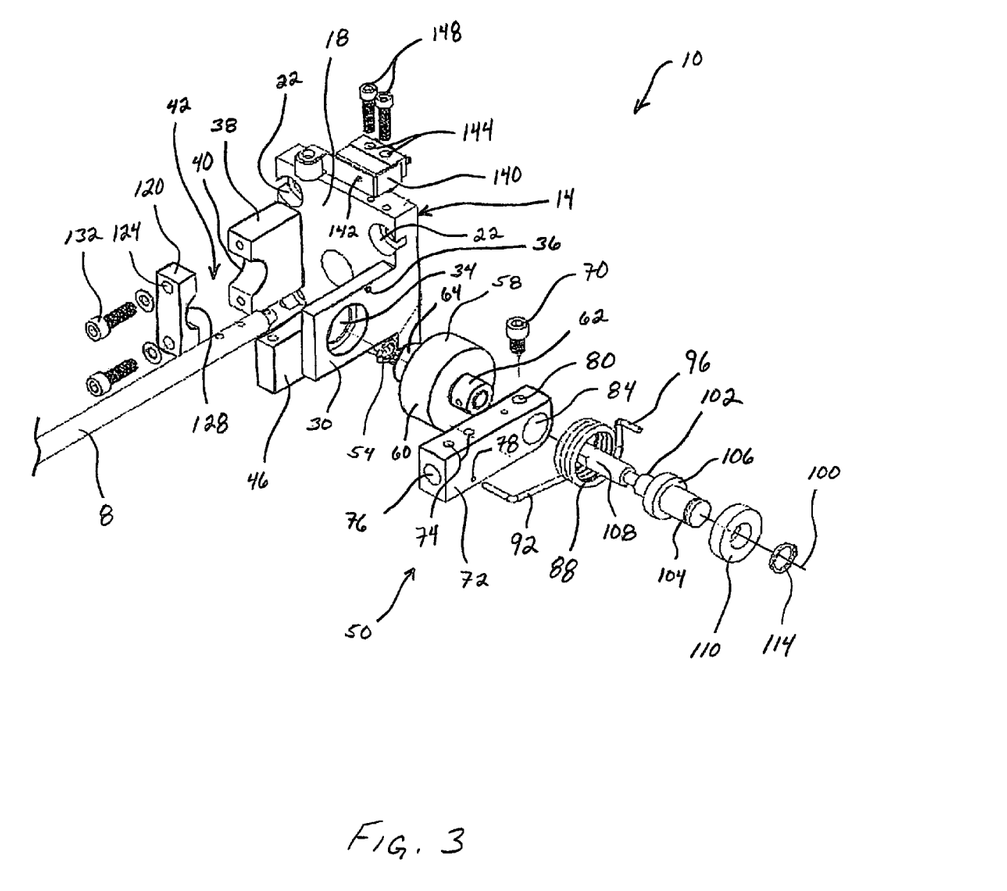
FIG. 3 illustrates an exploded perspective view of the low-energy locking hinge mechanism of FIG. 2.
Figure 4:
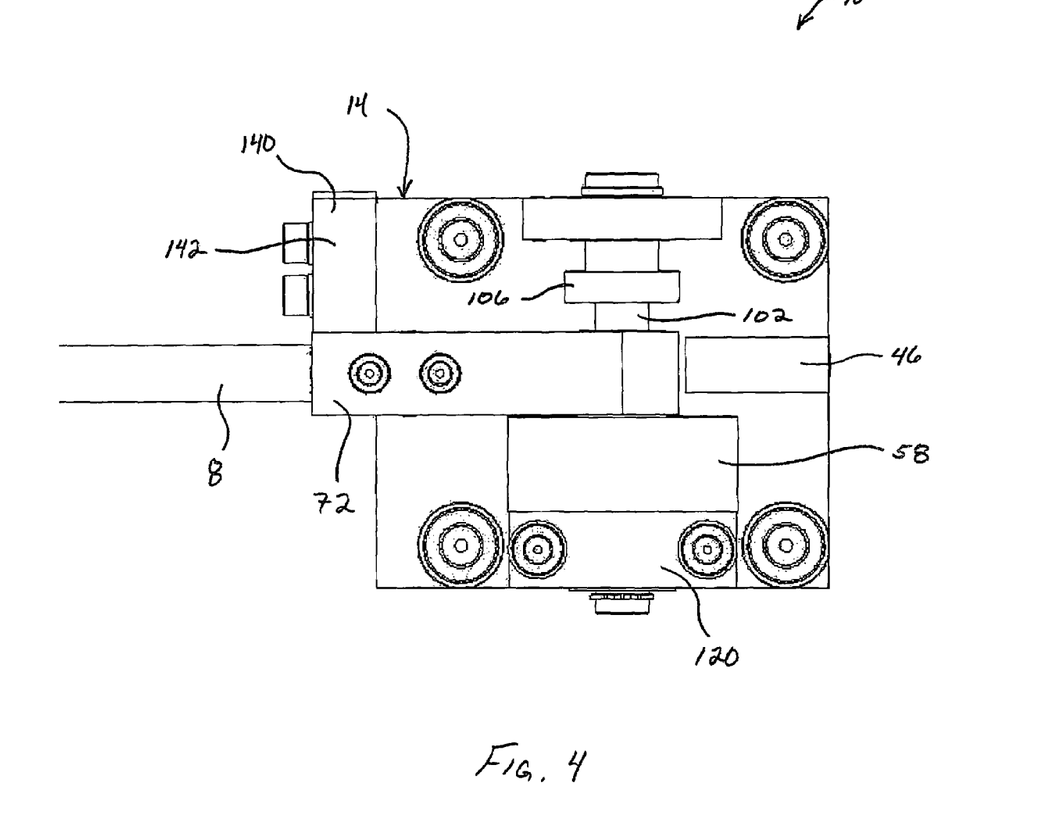
FIG. 4 illustrates a top view of the low-energy locking hinge mechanism of FIG. 2.
Figure 5:
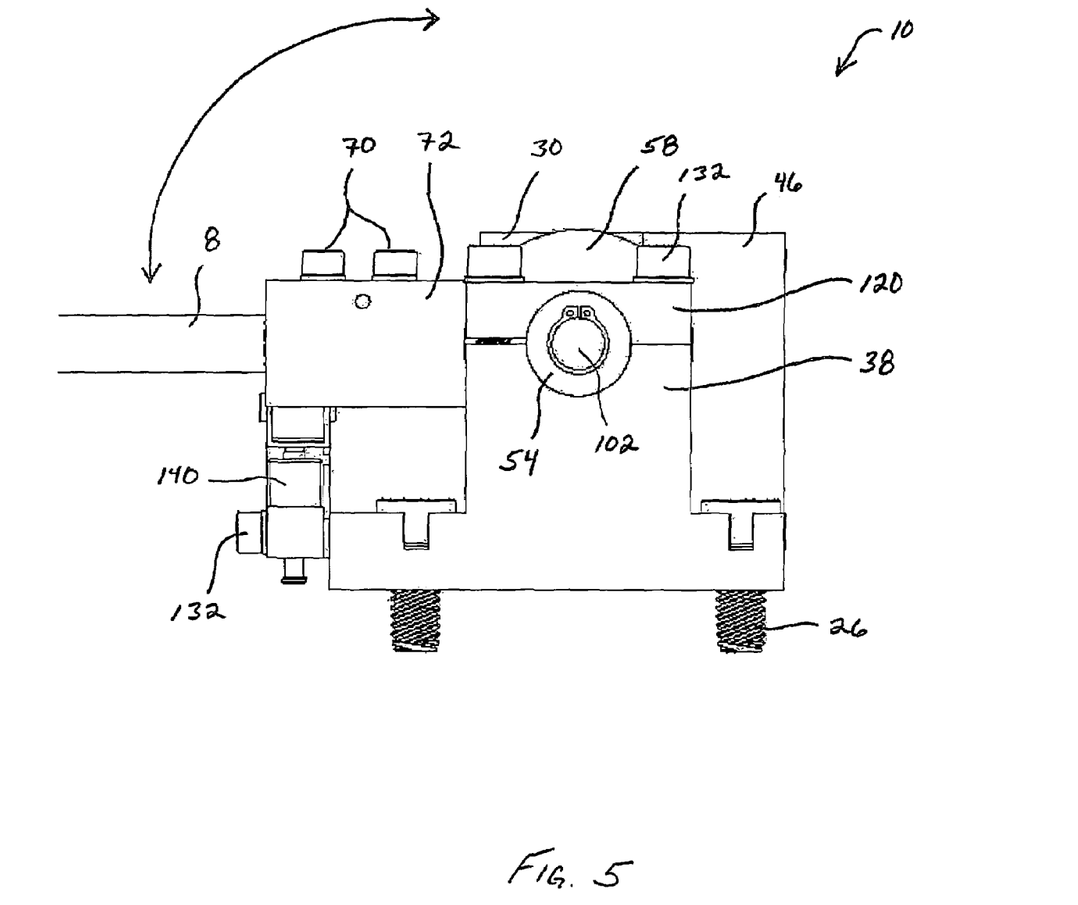
FIG. 5 illustrates a side view of the low-energy locking hinge mechanism of FIG. 2.

A supporting shaft 102 is configured to be inserted through and attached to a cam 62 of a one-way clutch 58, which is also a part of the deployment assembly 50. A first end 104 of the shaft 102 is supported by a ball or other suitable bearing 110. The first end 104 of the shaft 102 is configured to be inserted into an aperture formed in the bearing 110 until the bearing 110 is caused to come to rest against a flange 106 on the shaft 102. A retaining clip 114, or other suitable means, functions to secure the shaft 102 to prevent it from inadvertently sliding out of the bearing 110. The retaining clip 114 may fit within a groove formed about the shaft 102, and may be any known in the art. The bearing 110 is configured to be press fitted into an aperture 34 of the first mount 30, which aperture is sized and configured to receive the bearing 110.

A second end 108 of the shaft 102 is inserted through the one-way clutch 58 and attached or coupled to the cam 62 of the one-way clutch 58. The second end 108 is retained in place by a retaining clip 54 or other suitable means, configured to couple to the second end 108 of the shaft 102, and to prevent the shaft from inadvertently sliding out of the one-way clutch 58. In this configuration, the shaft 102 is operably or rotatably supported by the one-way clutch 58 and the first mount 30. As such, the shaft 102 is configured to rotate with the cam 62 of the one-way clutch 58, facilitated by the bearing 110 supported by the first mount 30.

An adapter 72 is supported about the shaft 102, and is configured to receive and support the deployable device 8, which is shown in this exemplary embodiment as an antennae. As such, adapter 72 and the deployable device 8 is configured to rotate about a pivot axis defined by the central axis of the shaft 102. The adapter 72 comprises an elongate member having a lateral bore 84 configured to receive a portion of the shaft 102. The adapter 72 is designed to be securely coupled to the shaft 102, using any known means or method, so as to prevent the adapter 72 from rotating about the shaft 102. In other words, the adapter 72 is preferably configured to be fixedly attached to the shaft 102, so that the adapter 72 only rotates upon rotation of the shaft 102. In the exemplary embodiment shown, the adapter 72 is secured to the shaft 102 using a set screw 70 that may be inserted through aperture 80 until properly set against the shaft 102.

The adapter 72 further comprises a receiver 76 configured to receive the deployable device 8 for the purpose of securing this to the adapter 72. In the embodiment shown, the receiver 76 comprises a longitudinal bore in which the shaft of the antennae may be inserted. The antennae may be secured in place using any known means, such as by one or more set screws (not shown) inserted through corresponding apertures 74 formed in the adapter 72. Other means will be apparent to those skilled in the art. In essence, the adapter 72 functions to connect the deployable device to the cam 62 of the one-way clutch 58.

As will also be recognized by those skilled in the art, the adapter 72 may be sized and configured as needed, depending upon the particular type of deployable device 8 intended to be supported by the hinge mechanism 10. As such, the particular design and configuration shown herein is not meant to be limiting in any way.

Figure 6:
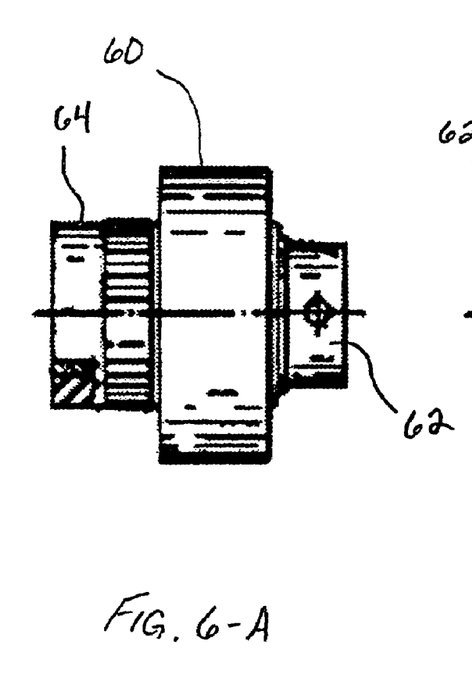

The deployment assembly 50 centers around the one-way clutch 58, which function is described in greater detail below with respect to FIGS. 6-A and 6-B. As properly positioned about the shaft 102, the one-way clutch 58 is supported about the support base 14 by the second mount 38. More specifically, the one-way clutch 58 comprises a housing 60 having an outer ring extension 64 that is fixedly coupled to the second mount 38. The outer ring extension 64 may be fixed or coupled to the second mount in a similar manner as the first end 104 of the shaft is coupled to the first mount 30, namely using an interference fit, wherein the outer ring extension 64 is press fitted into an aperture 42 formed within the second mount 38.

In another exemplary embodiment, the hinge mechanism 10, and particularly the deployment assembly 50, may further comprise a hold and release mechanism or system configured to selectively secure the clutch 58 in a secured position and to release the clutch 58. In one exemplary embodiment, the hold and release mechanism comprises a clamp 120 configured to couple to the second mount 38 to secure the one-way clutch 58 to the support base 14. The clamp 120 may be configured with a recess 128 that mates with a corresponding recess 40 formed in the second mount 38 to form an aperture that is sized and configured to receive and secure the outer ring extension 64 of the one-way clutch 58 when the clamp 120 is coupled to the second mount 38. The clamp 120 may be secured to the second mount 38 using any known fastening or coupling means known in the art, such as set screws 132 that are inserted through apertures 124 formed in the clamp 120, and ultimately received in corresponding apertures formed in the second mount 38. The clamp 120 is configured to be tightened to exert a force against the outer ring extension 64, which force acts to prevent rotation of the housing 60 about the support base 14 and the second mount 38. With the outer ring extension 64 secured, the cam 62 of the clutch 58 is permitted to rotate to facilitate proper operation of the one-way clutch 58 and deployment of the deployable device 8. More specifically, with the outer ring extension secured, the clutch 58 is permitted to facilitate rotation of the shaft 102, the adapter 72, and therefore the deployable device 8, in only a single direction, namely from a stowed position to a deployed position.

The clamp 120 is also configured to release the outer ring extension 64, thereby permitting the housing 60 of the clutch 58 to rotate. The clamp 120 may be released by loosening or releasing the means used to secure the clamp 120 to the second mount 38, which in the embodiment shown, is the set screws 132. By releasing the clamp 120 from the outer ring extension 64, the entire clutch 58 may be caused to rotate in a direction opposite the rotation of the cam 62 permitted by the clutch 58 as secured to the second mount 38 with the clamp tightened. This essentially allows the clutch, and the deployable device 8 to be reset into a stowed position. Because the one-way clutch 58 only permits rotation of the cam 62 and the deployable device 8 in a single direction (i.e., from a stowed position to a deployed position), the deployable device 8 may only be reset to the stowed position if the housing 60 of the clutch 58 is permitted to rotate. The use of a clamp or other similar hold and release mechanism or system is optional and not required for proper operation of the hinge mechanism 10. Indeed, many deployable devices will not need to be reset to a stowed position after deployment depending upon the type of environment in which they are intended to be operated within.

The deployment assembly 50 further comprises an actuation member 88 configured to be selectively actuatable to cause the deployed device 8 to transition from a stowed position to a deployed position. The actuation member 88 functions primarily to provide the force needed to effectuate such a transition. Indeed, a force is needed to cause the deployable device 8 to transition from a stowed position to a deployed position, which force may be configured to be just sufficient to overcome friction and other forces or losses inherent within the deployment assembly 50, and/or any of its components. For example, the one-way roller clutch 58 may comprise a small degree of inherent drag or friction that would oppose rotation of the cam 62. In this case, the actuation member 88 may be configured to provide a force that would overcome these. In addition, the force may further be configured to overcome any inertia existing within the deployment assembly 50 in addition to any friction or other losses.

Inasmuch as the present invention centers around deployable devices for satellites, it is anticipated that deployment of some deployable devices will take place in the zero (or reduced) gravity environment of space, which is otherwise known as a weightless environment. As such, it is contemplated herein that the actuation member 88 may be configured to provide an actuation force that would be just sufficient to deploy the deployable device 8 within this zero gravity environment. Stated differently, it is contemplated that the actuation member 88 may be configured to comprise just enough of an actuation force to overcome all inertia, friction, and other forces or losses within a zero gravity environment, which are relatively small, and to transition the deployable device 8 from its stowed position to its deployed position, wherein the same actuation force would not be sufficient to perform the same functions under gravity. Indeed, within a zero gravity environment, the actuation member 88 need only exert a force sufficient to initiate motion within the deployment assembly 50 as there is little resistance to this motion.

Moreover, due to the presence of the one-way clutch 58, and its inherent no-latch configuration, the actuation force exerted by the actuation member 88 is not required to be sufficient to overcome a latching force, as is common in most prior related hinge mechanisms. Specifically, because of the use and design of the one-way clutch 58, the hinge mechanism 10 does not comprise a latch, and therefore no latching energy must be overcome to lock the deployable device in a deployed position. As such, the actuation force exerted by the actuation member 88 may be configured to be further reduced as compared to those hinge mechanisms for deployable devices that require a latching energy to be overcome. The presence of a one-way clutch, the absence of a latch, and operation of the hinge mechanism within a zero or low gravity environment all contribute to the reduction in the actuation force that is required to be exerted by the actuation member 88 to deploy the deployable device 8. A reduced actuation force results in a reduced amount of actuation energy that is contained within the actuation member and that is needed. It is for these reasons that the present invention hinge mechanism may be considered a low-energy locking hinge mechanism.

For different deployables to be used in different applications, the corresponding hinge mechanism, and particularly the actuation member of the deployment assembly present therein, may be configured to exert a different actuation force. Indeed, the type, size, and configuration of the deployable device, as well as other factors that influence or impact the deployment of the deployable device, will determine the magnitude of the actuation force to be used for any one particular application.

In one exemplary embodiment, the actuation member 88 may comprise a loaded torsional spring 90, situated or disposed about the shaft 102 and having first and second arms 92 and 96, respectively. The first arm 92 may be configured to couple to the adapter 72 via aperture 78 formed therein, to operably couple the spring 90 to the adapter 72. The second arm 96 may be configured to couple to the first mount 30 via aperture 36 formed therein, to operably couple the spring 90 to the support base 14. The spring 90 is further configured to comprise a loaded and an unloaded state. As situated within the deployment assembly 50, and with the deployable device 8 positioned in a stowed position, the spring 90 is configured to be supported in its loaded state. In other words, the spring 90 is pre-loaded as the hinge mechanism 10 is assembled. The spring 90 functions to urge or push the deployable device 8 to the deployed position. The spring 90 is configured to be coiled around the shaft 102 and to comprise potential energy that causes the deployable device 8 to rotate or transition to a deployed position.

The hinge mechanism 10, and particularly the deployment assembly 50, further comprises means for actuating the actuation member 88. The means for actuating may comprise one or more mechanisms or systems used to maintain or hold the actuation member in a non-actuated state until the time conies to deploy the deployable device, at which time the system would simply be activated to release the deployable device and to cause the actuation member to exert an actuation force that would deploy the deployable device and actuate the one-way clutch. In the embodiment shown, this would comprise one or more mechanisms or systems for maintaining the spring 90 in its loaded state. The means for actuating the actuation member may comprise any system, device, or mechanism that interacts with any one or more of the components in the deployment assembly to maintain the non-actuated state of the actuation member, and to prevent the rotation of the deployable device that would otherwise occur as a result of the exertion of the actuation force by the actuation member.

In one exemplary embodiment, means for actuating the actuation member comprises an electro-magnetic pin, a motor-driven pin, explosive bolts, non-explosive-severance nuts, link-wire actuator, etc. A motor-driven pin may be used to hold the deployable device in the stowed position. In this case, an electric motor may linearly actuate a shaft or pin to release the deployable device. By using explosives, the deployable system is directly restrained by a bolt that is cut or fractured by an explosive charge. In these examples, the deployable device may be released by a controlled mechanism. Essentially, the means for actuating can be any commonly known controllable system or device, such as pins, wires, a shaft-driven motor, explosives, etc., that allow the deployable device to be deployed into position and that allow the actuation member to effectuate this.

The hinge mechanism 10 may further comprise a riser integrally formed with the support base 14, or, if a separate structure, coupled to the support base 14, wherein the riser functions to maintain a suitable position (e.g., elevation and or orientation) of the deployable device 8 with respect to the support base 14. As shown, the hinge mechanism 10 comprises a separate riser 140 configured to be coupled to the support base 14. The riser 140 comprises apertures 144 formed therein, wherein bolts 148 may be inserted, therethrough and into corresponding apertures formed in the support base 14 to secure the riser 140 to the support base 14. The deployable device 8 may rest upon the surface 142 of the riser 140 to maintain a proper position with respect to the support base 14, which position may be impacted by the configuration and assembly of one or more components of the deployment assembly 50, such as the one-way clutch 58 as situated about the shaft 102. The riser 140 may comprise any size and shape as needed.

It is noted herein, that a hinge mechanism may comprise multiple deployment assemblies and multiple deployment devices supported about a common support base, each of these deployment assemblies comprising a one-way clutch operable with the deployment device.

As indicated above, the present invention hinge mechanism 10 centers around the presence of a one-way clutch within the deployment assembly, which functions as the component for locking the deployable device in a deployed position without the need to overcome a latching energy. With reference to FIGS. 6-A and 6-B, illustrated is a one-way roller clutch in accordance with one exemplary embodiment. Specifically, FIGS. 6-A and 6-B illustrate a one-way roller clutch of the type sold by Helander Products, Inc. of Clinton Conn. Of course, as will be apparent to those skilled in the art, other types and designs of one-way clutches are contemplated for use within the present invention hinge mechanism. As such, the one-way clutch described herein and shown in FIGS. 6-A and 6-B should not be construed as limiting in any way, but should be considered merely as one exemplary embodiment of a one-way clutch.

As shown, the one-way clutch 58 comprises a housing 60 that includes an outer ring extension 64, a cam 62, a series of rollers 65 disposed within respective recesses or pockets 66, and a series of springs 67 biasing the rollers 65. The function of this one-way clutch is commonly known in the art and not described in detail herein, except where applicable to the present invention.

The one-way clutch 58 is utilized to provide a simple and robust locking system for a deployable device, and to eliminate the need for a latch and the requirement for the hinge mechanism to provide a latching energy to overcome a latch. The one-way clutch 58 is configured to transmit torque in only one direction with free movement in the opposite direction between the inner cam 62 and the outer shaft or housing 60 (including the outer ring extension 64). However, as utilized within the hinge mechanism of the present invention, the one-way clutch 58 is configured so that the free movement of the clutch is oriented in the deployment direction in which the deployable device transitions from a stowed position to a deployed position. In this rotational direction, the rollers 65 are disengaged or free and do not counter any significant resistance.

Upon rotation of the deployable device, the one-way clutch 58 is actuated to prevent counter or backward rotation or motion. In this configuration, the one-way clutch 58 will thus be configured to transmit torque in the opposite direction, wherein the rollers 65, being energized by the springs 67, will be caused to engage in the event the deployable device has a tendency to move from its stowed position, thus locking the deployable device in place. In other words, the constraint of the one-way clutch 58 is configured to prevent backward motion of the deployable device. The locking action is provided by the rollers 65 being constrained in the v-groove pocket or recess 66 of the cam 62.

Within the context of the present invention, with the free motion oriented to deploy the deployable device, and with the constraint being used to prevent backward motion during transition and once the deployable device has achieved its final deployed position, which is preferably at rest against the stopper discussed above, the one-way clutch 58 functions to prevent and/or eliminate undesirable backlash and rebound that are common in prior related hinge mechanisms. The one-way clutch provides the ability to lock the hinge mechanism and the deployable device in place without requiring energy to latch, which advantageously provides the ability to diminish or reduce the size and stored energy of the actuation member to a necessary minimum for a zero gravity application, as discussed above.

Figure 7:
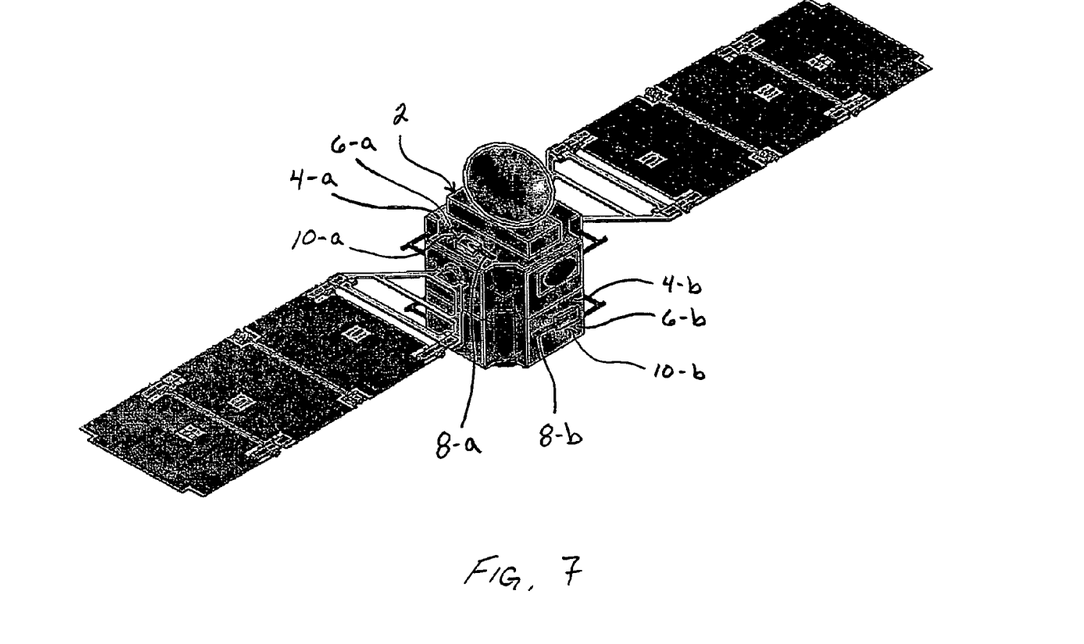
FIG. 7 illustrates a perspective view of a satellite having a plurality of low-energy hinge mechanisms operable therewith.

With reference to FIG. 7, illustrated is a perspective view of an exemplary satellite variant having a plurality of deployable devices operable therewith. Each of the deployable devices is supported by a low-energy locking hinge mechanism configured in accordance with one exemplary embodiment of the present invention. Specifically, FIG. 7 illustrates a communications variant of a small satellite 2 constricted in accordance with the platform architecture technology described in copending U.S. patent application Ser. No. 11/417,003, filed May 2, 2006, and entitled, "Modular Platform Architecture for Satellites". The small satellite comprises a plurality of modules, some of which may be various structural modules, such as panels. As shown, the small satellite 2 comprises a satellite structure in the form of an upper panel 4-*a* having a surface 6-*a* upon which a deployable device, shown as deployable device 8-*a* is mounted. The deployable device 8-*a* is supported by a present invention low-energy locking hinge mechanism, shown as low-energy locking hinge mechanism 10-*a*, which is coupled to the upper panel 4-*a*. The small satellite 2 further comprises additional structural modules in the form panels, such as side panel 4-*b* having a surface 6-*b* upon which deployable device 8-*b* is mounted, being supported by a similar low-energy locking hinge mechanism 10-*b* coupled to the side panel 6-*b*.

As one skilled in the art will recognize, the satellite illustrated in FIG. 7 is only an exemplary satellite. The present invention may be configured for use on any type of satellite design. In addition, one skilled in the art will recognize that a satellite may comprise any number of deployable devices. Indeed, from the exemplary satellite variant shown in FIG. 7, it is possible for a single satellite or satellite variant to comprise a single deployable or deployable device, or multiple deployables or deployable devices located at different positions on the satellite. One advantage of equipping a satellite with multiple deployables, particularly when at least some of these deployables comprise an antennae, is that the satellite variant can receive optimal transmitted signals at any orientation within its orbit.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to full within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A low-energy locking hinge mechanism operable with a spacecraft to support a deployable device, and to facilitate the deployment and locking of said deployable device, said hinge mechanism comprising:
   a support base configured to couple to a structure of said spacecraft;
   means for securing a deployable device to said support base, said deployable device being configured to rotate about a pivot axis;
   a one-way clutch supported about said support base and operable with said means for securing, said one-way clutch being configured to facilitate one-way rotation of said deployable device from a stowed position to a deployed position, and to lock said deployable device in said deployed position, said one-way clutch having an inherent actuatable locking function configured to prevent backward motion; and
   an actuation member operable with said one-way clutch to deploy said deployable device from said stowed position to said deployed position, said actuation member comprising an actuation energy sufficient to actuate said locking function of said one-way clutch within a zero-gravity environment;
   wherein said one-way clutch comprises:
   a housing fixedly coupled to a component of said support base;
   a cam configured to rotate relative to said housing, said cam also configured to receive and secure to a shaft rotatably supported by said support base;
   a series of rollers disposed within corresponding pockets formed in said cam, said rollers being configured to permit one-way rotation and to constrain backward rotation; and a series of springs configured to energize said rollers within said pockets to facilitate prevention of said backward rotation.

2. The hinge mechanism of claim 1, further comprising a stopper supported by said support base and configured to limit the rotation of the deployable device, and to define said deployed position and a resulting deployment angle of said deployable device.

3. The hinge mechanism of claim 2, wherein said deployment angle ranges between 0 and 360 degrees, as measured from said stowed position.

4. The hinge mechanism of claim 2, wherein said deployment angle ranges between 0 and 180 degrees, as measured from said stowed position.

5. The hinge mechanism of claim 2, wherein said stopper comprises an adjustment mechanism configured to permit selective adjustment of said deployment angle and said deployed position of said deployable device.

6. The hinge mechanism of claim 2, further comprising an impact absorption member operable with said stopper to reduce an impact force resulting from limiting the rotation of said deployable device.

7. The hinge mechanism of claim 1, wherein said one-way clutch is configured to prevent counter-rotation of said deployable device to eliminate undesirable backlash and rebound.

8. The hinge mechanism of claim 1, wherein said means for securing comprises:
first and second mounts extending upward from said support base;
a support shaft rotatably supported by said first and second mounts, said shaft being operable with said one-way clutch;
an adapter secured to and supported about said support shaft and configured to receive and secure said deployable device, said support shaft and said adapter being configured to rotate about a pivot axis.

9. The hinge mechanism of claim 8, wherein said actuation member comprises a torsional spring operably disposed about said support shaft, and operably coupled to said adapter and said support base or a component thereof.

10. The hinge mechanism of claim 1, further comprising a riser coupled to said support base, and operable to maintain said deployable device at a desired position relative to said support base.

11. The hinge mechanism of claim 1, further comprising means for actuating said actuation member, said means for actuating functioning to maintain said deployable device in a stowed position until a desired time of deployment, at which time said means for actuating is selectively manipulated to actuate said actuation member.

12. The hinge mechanism of claim 11, wherein said means for actuating said actuation member comprises a controllable device or system selected from the group consisting of an electro-magnetic pin, a motor-driven pin, explosive bolts, non-explosive-severance nuts, link-wire actuator, a shaft-driven motor, wires, and any combination of these.

13. The hinge mechanism of claim 1, further comprising a hold and release mechanism configured to selectively secure a housing of said one-way clutch in a secured position with respect to said support base, and to selectively release said one-way clutch to permit said one-way clutch and said deployable device to be reset to a stowed position.

14. The hinge mechanism of claim 13, wherein said hold and release mechanism comprises a clamp releasably secured to said support base, or a component thereof.

15. The hinge mechanism of claim 1, wherein said actuation member comprises an actuation energy dictated by a type and configuration of said deployable device.

16. A deployment system operable with a spacecraft and configured to deploy a deployable device, said deployment system comprising:
a deployable device operable with said spacecraft;
a hinge mechanism coupled to a structure of said spacecraft and configured to support said deployable device, as well as to facilitate deployment of said deployable device, said hinge mechanism comprising:
a support base configured to couple to a structure of said spacecraft;
means for securing a deployable device to said support base, said deployable device being configured to rotate about a pivot axis;
a one-way clutch supported about said support base and operable with said means for securing, said one-way clutch being configured to facilitate one-way rotation of said deployable device from a stowed position to a deployed position, and to lock said deployable device in said deployed position, said one-way clutch having an inherent actuatable locking function configured to prevent backward motion; and
an actuation member operable with said one-way clutch to deploy said deployable device from said stowed position to said deployed position, said actuation member comprising an actuation energy sufficient to actuate said locking function of said one-way clutch within a zero-gravity environment;
wherein said one-way clutch comprises:
a housing fixedly coupled to a component of said support base;
a cam configured to rotate relative to said housing, said cam also configured to receive and secure to a shaft rotatably supported by said support base;
a series of rollers disposed within corresponding pockets formed in said cam, said rollers being configured to permit one-way rotation and to constrain backward rotation; and
a series of springs configured to energize said rollers within said pockets to facilitate prevention of said backward rotation.

17. The deployment system of claim 16, further comprising a plurality of said hinge mechanisms configured to share a common support base, said plurality of hinge mechanisms being operable with a plurality of respective deployable devices.

18. A method for retaining and selectively deploying a deployable device as operable within a deployment system on a satellite, said method comprising:
obtaining a hinge mechanism configured to support and to facilitate the deployment and locking of a deployable device, said hinge mechanism comprising a one-way clutch and an actuation member supported about a support base;
relating a deployable device to said hinge mechanism; and
actuating an actuation member comprising an actuation energy sufficient to cause said deployable device to transition from a stowed position to a deployed position, and to thus actuate said one-way clutch within a zero-gravity environment;
wherein said one-way clutch comprises:
a housing fixedly coupled to a component of said support base;

a cam configured to rotate relative to said housing, said cam also configured to receive and secure to a shaft rotatably supported by said support base;

a series of rollers disposed within corresponding pockets formed in said cam, said rollers being configured to permit one-way rotation and to constrain backward rotation; and a series of springs configured to energize said rollers within said pockets to facilitate prevention of said backward rotation.

19. The method of claim 18, wherein said actuating comprises manipulating means for actuating said actuation member to release said actuation energy.

20. A method for constructing a hinge mechanism for a deployable device, said method comprising:

supporting a one-way clutch about a support base, said one-way clutch comprising a low-energy locking function;

relating said one-way clutch to said deployable device;

supporting an actuation member about said support base, and configuring said actuation member to exert an actuation force comprising an actuation energy sufficient to cause said deployable device to transition from a stowed position to a deployed position, and to thus actuate said one-way clutch, within a zero-gravity environment; and relating said actuation member to said one-way clutch to facilitate rotation of said deployable device with respect to said support base, and actuation of said one-way clutch;

wherein said one-way clutch comprises:

a housing fixedly coupled to a component of said support base;

a cam configured to rotate relative to said housing, said cam also configured to receive and secure to a shaft rotatably supported by said support base;

a series of rollers disposed within corresponding pockets formed in said cam, said rollers being configured to permit one-way rotation and to constrain backward rotation; and a series of springs configured to energize said rollers within said pockets to facilitate prevention of said backward rotation.

* * * * *